July 22, 1958  K. A. KLINGLER  2,844,168
QUICK ACTING VALVE WITH STATIC SEAL
Filed Sept. 18, 1952  4 Sheets-Sheet 3

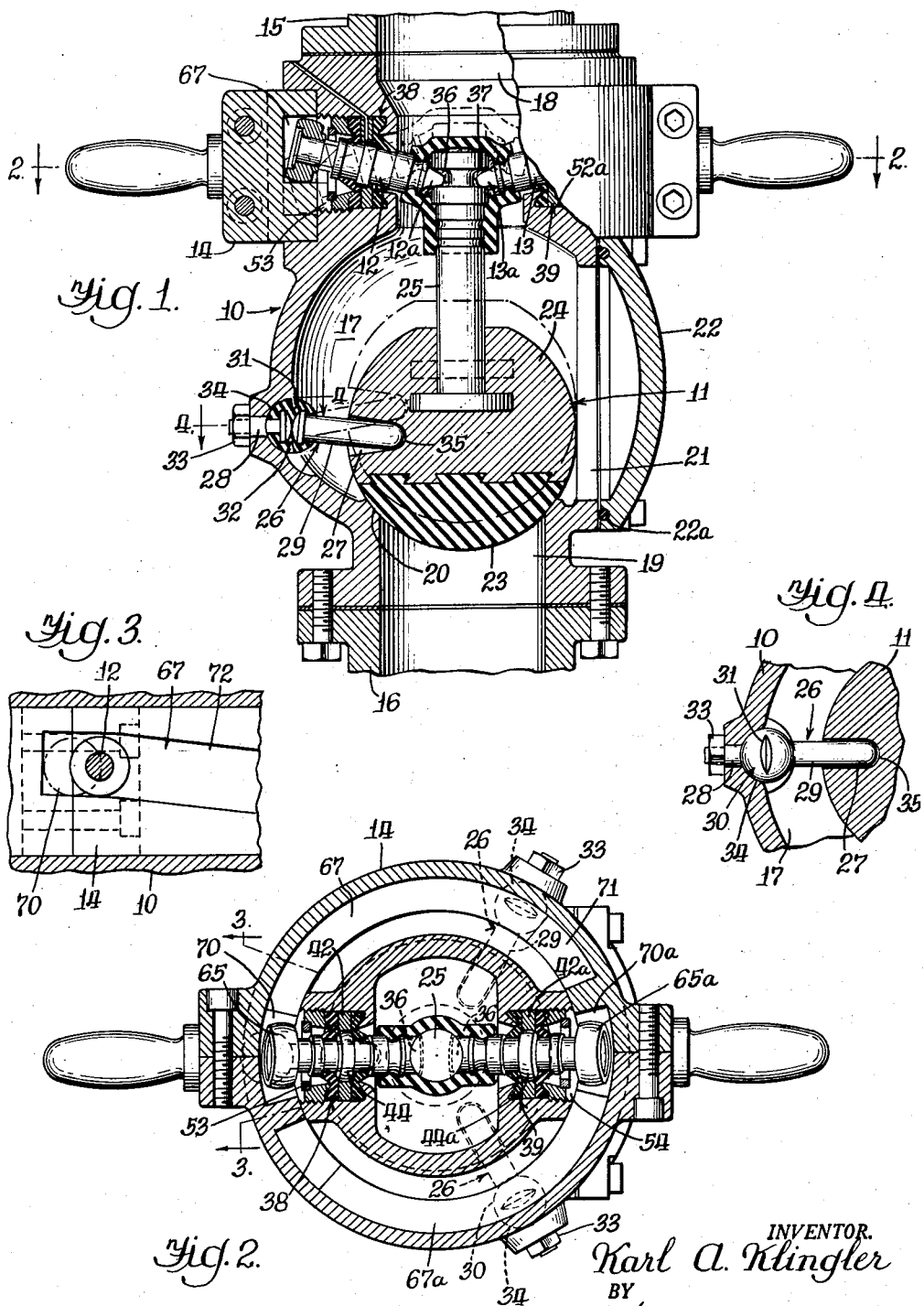

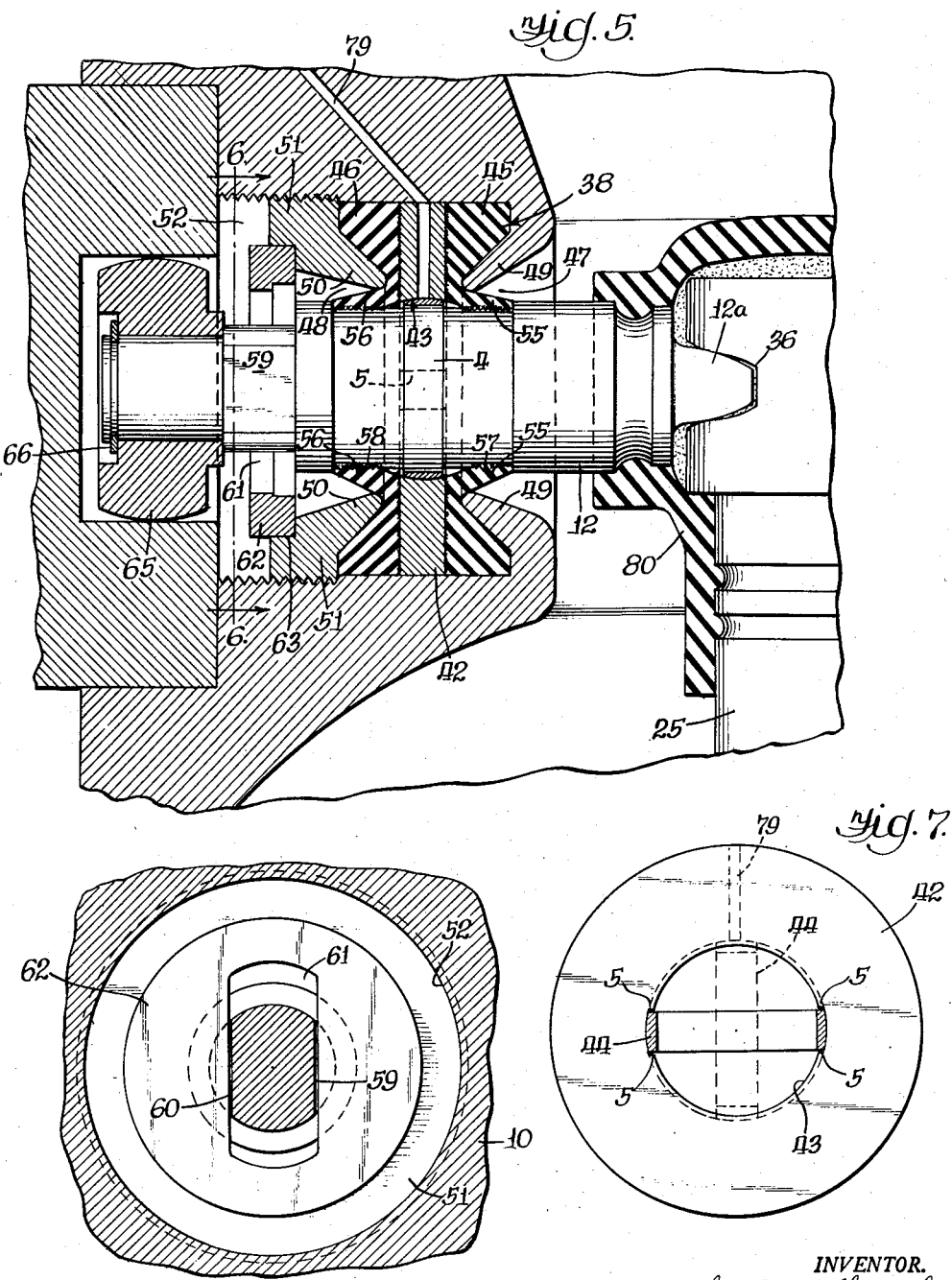

INVENTOR.
Karl A. Klingler
BY
Harvey M. Gillespie
Atty

July 22, 1958    K. A. KLINGLER    2,844,168
QUICK ACTING VALVE WITH STATIC SEAL
Filed Sept. 18, 1952    4 Sheets-Sheet 4

INVENTOR.
Karl A. Klingler
BY
Harvey M. Gillespie
Atty

United States Patent Office 2,844,168
Patented July 22, 1958

2,844,168

QUICK ACTING VALVE WITH STATIC SEAL

Karl A. Klingler, Naperville, Ill.

Application September 18, 1952, Serial No. 310,249

17 Claims. (Cl. 137—630)

This invention relates to an improved valve structure.

A principal object is to provide a valve structure in which one or more pivotally supported levers extend into a pressure chamber, defined by a valve casing, and have operative engagement with a portion of the valve element therein; the said levers being pivotally supported in a static seal clamped to the valve casing.

Another object is to provide, in a valve structure of the above character, novel means for sealing the valve operating levers in the casing, which sealing means is constructed to withstand high pressures within the valve casing and also provides for maximum freedom of movement of the levers.

Another object is to provide a loose operating connection of novel construction between the valve operating levers and the valve and to also provide a fluid tight seal surrounding said connection and providing a chamber suitable for containing lubricant.

Another object is to provide novel means in the form of flexible arms for maintaining the valve element centered in relation to the port which it controls.

A further object is to provide, in a valve structure of the above character, a valve element with an auxiliary valve which is adapted to open in advance of the main valve so as to reduce the pressure differential on opposite sides of the main valve and thereby reduce the force required to open said main valve.

According to the invention, a valve element, preferably in the form of a ball, is enclosed in a valve casing in a position to close a port therein, the valve element being maintained in a centered position relative to the port by means of a plurality of flexible arm members supported to extend inwardly from the wall of the valve casing and into engagement with the valve element. The valve element includes a stem, the upper end of which is loosely engaged with a pair of operating levers. The said operating levers are pivotally supported in static sealing members which constitute closures for openings at opposite sides of the valve casing. The outer ends of the operating levers are provided with rollers which extend into a cam groove of a cam ring, the latter of which is rotatably supported for rotational movement about the outer surface of the casing. The cam ring is preferably made in sections so that it can be clamped about an outer portion of the casing. The cam grooves are formed in the ring and are inclined at a suitable pitch so that a turning movement of the cam ring in one direction tilts the operating levers in a direction to move the valve element away from its seat and a reverse movement of the cam ring tilts the lever in a direction to force the valve element into tight engagement with the valve seat.

The invention is illustrated, in certain preferred embodiments, in the accompanying drawings wherein:

Fig. 1 is a longitudinal sectional view illustrating a valve structure constructed in accordance with this invention;

Fig. 2 is a sectional view taken substantially on line 2—2 of Fig. 1;

Fig. 3 is a fragmentary sectional view taken on line 3—3 of Fig. 2 and illustrating the position of a roller element associated with the operating means when the valve is in its closed position;

Fig. 4 is a fragmentary sectional view taken substantially on line 4—4 of Fig. 1 and illustrating in plan one of a plurality of flexible members employed to maintain the valve element centered with respect to the port which the valve controls;

Fig. 5 is an enlarged fragmentary view in section of a valve operating lever and a static seal in which the lever is pivotally mounted; the lever being shown in an intermediate position to illustrate the normal contour of the sealing element;

Fig. 6 is a fragmentary sectional view taken on line 6—6 of Fig. 5, looking in the direction of the arrows;

Fig. 7 is a view of a metallic plate elements embodied in the sealing means shown in Fig. 5 and illustrating the manner in which an inner bearing ring is inserted in an opening in the plate;

Figure 8:
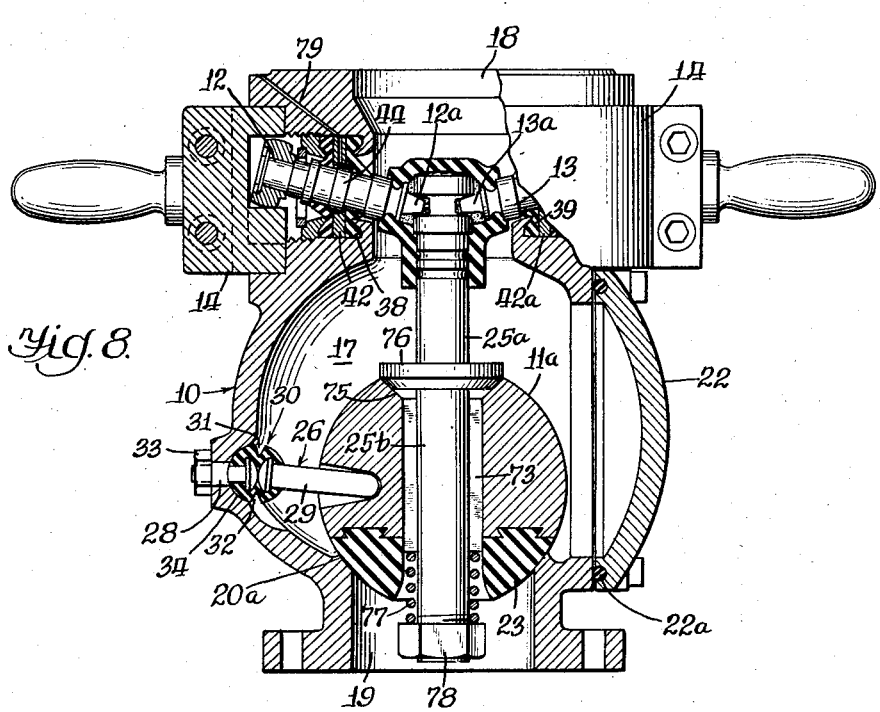
Fig. 8 is a longitudinal sectional view of a modified form of valve structure.

Referring first to Figs. 1 to 7, inclusive, of the drawings: The embodiment illustrated in said Figs. 1 to 7 inclusive includes a valve casing 10, a valve element 11 enclosed in the casing, a pair of valve operating levers 12, 13, and a cam 14 for tilting said levers so as to impart opening and closing movements to the valve element 11.

The valve casing 10 is constructed to be interposed in a fluid pressure line including pipe sections 15, 16. The said casing includes a pressure chamber 17 communicating through a receiving port 18 with the pipe section 15 and communicating through a discharge port 19 with the pipe section 16. A valve seat 20 surrounds the discharge port 19 and is curved to fit the curvature of the valve 11. The valve casing 10 is made in two sections to facilitate insertion of the valve element into the casing 10. The said casing may be separated along various lines; however, for purpose of convenience of illustration the casing 10 includes a main section provided with a side opening 21 through which the valve 11 is inserted and a closure plate section 22. The plate is suitably clamped to the main section and suitable packing 22ª is positioned between the closure plate 22 and the main body 10.

The valve element 11 is preferably, but not necessarily, in the form of a ball made partly of metal and partly of rubber. The rubber portion 23 is securely fixed to the metal portion 24 and is adapted to engage the seat 20. A valve stem 25 is cast integrally with the metallic portion 24 of the valve or otherwise suitably secured thereto. The upper end of the stem 25 is operatively connected with the operating levers 12 and 13, as will be hereinafter described.

The valve element 11 is maintained in a central position in the casing relative to the discharge port 19 by means of at least three flexible arm units designated as a whole by the reference numeral 26. Each unit 26 is secured to the wall of the casing 10 and projects inwardly into individual V-shaped sockets 27 formed in the metallic portion 24 of the valve element 11. The said flexible units 26 are made to flex only in a single plane and thereby provide a hinged connection with the inner wall of the casing. Each unit 26 includes a pair of arms 28, 29, which are molded or otherwise suitably secured in a spherical rubber body 30. The spherical rubber body 30 is grooved on opposite sides only, as indicated at 31, 32 so that it will flex only in a single plane. One arm 28 of the unit extends through an opening in the valve casing and is threaded to receive a nut 33. The portion of the spherical body 30 to which the arm 28 is attached fits into a semi-spherical socket 34 formed in the casing 10. When the nut 33 is tightened against casing 10, a portion of the rubber body 30 is drawn into the socket 34 so as to provide a fluid-tight seal. The other arm 29 of the unit extends into the V-shaped socket formed in the metallic portion 24 of the ball valve, there being a slight clearance 35 between the inner end of the arm 29 and the bottom of the V-socket 27 so as to permit the arm 29 to move past its horizontal center during the opening and closing movements of the valve element 11.

Referring now to the operative connection of the levers 12, 13 with the valve stem 25, the upper end of the valve stem 25 is formed with transverse slots 36, 37 which receive end portions 12a, 13a of the operating levers 12 and 13, respectively. Each end portion 12a, 13a of said levers have contours in the form of a gear tooth and the transverse slots 36, 37 have corresponding contours so as to avoid excessive friction at the connection of the operating levers 12 and 13. The said operating levers are pivotally supported in static sealing elements 38, 39 of like construction positioned at opposite sides of the valve casing 10 to close openings 40, 41 through which the levers project into the pressure chamber 17 of the valve casing.

The sealing elements 38, 39 are of identical construction. It will be sufficient, therefore, to describe the sealing element 38 and identify the corresponding parts of the other seal with the same reference numerals provided with exponents "a." The sealing element 38 comprises a central metallic plate 42 formed with a circular central opening 43, the perimeter of which is curved transversely to correspond with a curved surface of an associated bearing ring 44 fixed to the valve operating lever 12. The curved surface of the bearing ring 44 and the co-engaging curved surface of the opening 43 in the plate 42 provide a metal-to-metal bearing which permits the valve operating lever 12 to tilt to various angular positions. The ring 44 is made separate from the operating lever 12 so that the ring can be inserted into the transversely curved opening 43. The said ring 44 may be readily inserted in the opening 43 through slots 5 (Fig. 7) until the ring is centered therein. Thereafter the ring can be turned to any desired position within the opening 43. After the ring 44 is applied in the opening 43, the operating lever 12 is inserted in the ring and the ring is sweated to a central rib 4 formed on the lever 12. Bonded to opposite faces of the plate 42 are rubber discs 45, 46 formed on their outer faces with V-shaped recesses 47, 48, respectively, to receive cone-shaped ribs 49, 50; the rib 49 being made integral with the valve casing 10 and the rib 50 forming a part of a clamping ring 51. The clamping rings 51, when screwed into counterbores 53, comprise the rubber portions of the sealing elements 38 and thereby provide a tight joint between the sealing element and the valve casing 10. Central hub portions 55, 56 are bonded or otherwise securely fixed to the operating lever 12 as indicated at 57, 58. It will be observed that the co-engaging curved surfaces of the plate 42, 43 of the bearing rib 44 of the sealing element 38 provide, in effect, a ball and socket connection and the hub portion 55, 56 of the rubber elements flex in response to the tilting movements of the levers 12. It will also be apparent that the sealing element is not necessarily limited to the specific structure herein shown and that it may be used in various situations when it is desirable to extend a tiltable lever through a wall of a pressure chamber and into engagement with a movable element housed in said pressure chamber.

The outer end of each tilting lever 12, 13 is reduced in diameter and the opposite side faces of the reduced portion are formed to provide flat surfaces 59, 60 which extend through an elongated slot 61 formed in a guide 62, the latter of which is pressed or otherwise suitably fixed in a recess 63 formed in the clamp ring 51 after the clamp ring has been tightened to its applied position. The guide 62, therefore, serves to confine the flexing movements of the levers in the present disclosure to vertical tilting movements. The extreme outer end of each operating levers 12, 13 are further reduced in diameter, as indicated at 64, 64a and rollers 65, 65a are operably mounted on said reduced portions of the levers and secured in position thereon by means of spring lock washers 66, 66a. The peripheries of each roller 65, 65a are curved transversely with a radius corresponding to the radius of the roller. The roller 65 is positioned in a cam channel 67 formed in a cam ring 14. The transversely curved periphery of the roller makes it possible to maintain contact with the upper and lower surfaces of the cam groove for all tilted positions of the lever 12. The roller 65a is positioned in a like cam channel 67a formed in the cam ring 14 at the opposite side thereof.

The levers 12, 13 are tilted to various positions by rotation of the cam ring in a counter-clockwise direction with respect to Fig. 2. The said ring is formed in two parts and clamped together by means of bolts 68 and are provided with operating handles 69. The cam channel 67 is provided with end portions 70, 71 which have only slight inclination and with an intermediate portion 72 having a pronounced inclination or spiral, whereby the lever 12 is moved only slightly when the roller 65 reaches in the end of the cam groove, but the inclination of the intermediate portion 72 of the cam groove 67 is sufficient to impart a pronounced tilting movement to the lever 12 and thereby effect quick opening and closing movements to the valve element 11. Preferably the inclination of the intermediate portion 72 of the cam groove 67 is such that the valve element 11 is moved to its fully open or to its fully closed position with less than one-half rotation of the cam ring 14. When the cam ring 14 is rotated in a counter-clockwise direction with respect to Fig. 2, the levers 12, 13 move about their pivotal axis in a direction to open the valve. When the cam 14 is rotated in the opposite direction the levers 12, 13 are tilted to move the valve to its closed position. The slightly inclined end portions 70, 70a of the cam grooves 67, 67a provide for take-up movement of the valve to compensate for compression of the rubber portion 23 of the valve element 11 when the latter is pressed against the seat 20.

Figure 9:
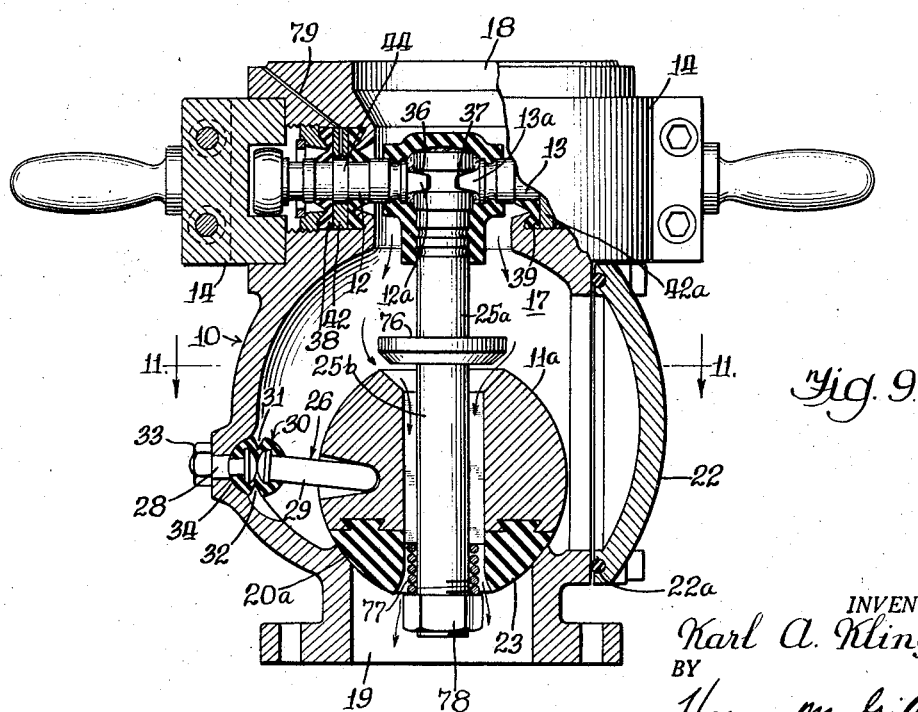
Fig. 9 illustrates the same structure but showing the operating mechanism in a slightly different position from that illustrated in Fig. 8.
Figure 10:
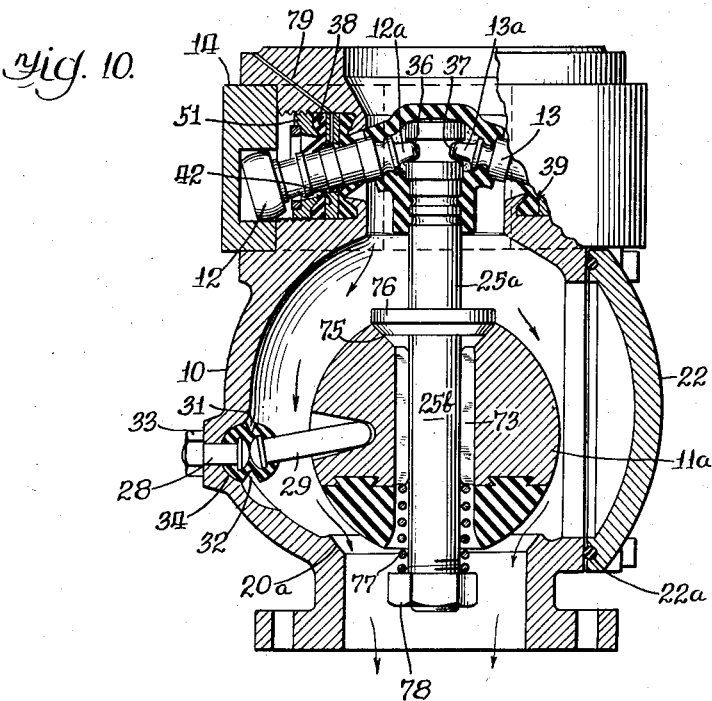
Fig. 10 shows the modified form of valve in its fully open position.
Figure 11:
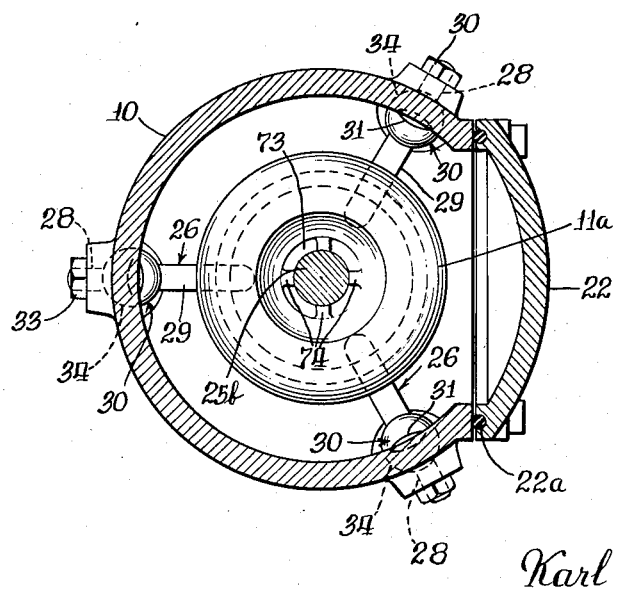
Fig. 11 is a sectional view taken substantially on line 11—11 of Fig. 9 and illustrating the position of the valve centering arms.

Referring to Figs. 8, 9, 10 and 11 wherein a valve structure of the same general character shown in the preceding figure is provided with a modified valve element. In this modification the valve operating mechanism is the same in all respects as the operating mechanism shown in the preceding figures. Therefore, the cam ring, the static seal elements 38, 39, and the operating levers 12, 13 are designated by the same reference characters as shown in Figs. 1 to 7 inclusive. The valve element designated 11a is provided with a central passage 73 formed with inwardly extending ribs 74 which have sliding engagement with the lower portion 25b of the valve stem 25a. One end of the passage 73 is flared outwardly, as indicated at 75, to provide a valve seat for an auxiliary valve 76 carried on the valve stem 25a. A coil compression spring 77 is interposed between one end of the ribs 73 of the valve element 11a and a nut 78 threaded onto the outer end of the valve stem. It will be observed that during the first movement of the cam ring 14 of the modified embodiment in a direction to impart an opening movement to the valve, results in first moving the auxiliary valve 76 so as to open the passage 73 and thereby permit the fluid under pressure to pass through the passage 73 and thereby reduce the pressure differential on opposite sides of the valve element 11a. Further movement of the valve stem in a direction to open the valve results in compressing the spring 77 and thereby lifting the valve element 11a from its seat 20a.

When the cam ring 14 of the modification is rotated in a direction to impart a closing movement to the valve element 11ª the valve stem is first moved to bring the auxiliary valve 76 in a position to close the passage 73. Further tilting movement of the operating levers 12, 13 serve to force the valve element 11ª against the seat 20ª.

The various elements shown in Figs. 8 to 11 inclusive and identified by the same reference characters as employed in Figs. 1 to 7 inclusive correspond in all respects to the elements shown in said Figs. 1 to 7 inclusive.

Inasmuch as the bearing ribs 44—44ª have a metal-to-metal contact with the metallic plates 42—42ª, oil ducts 79 are provided for delivering oil to the bearing surfaces. In order to provide adequate lubrication for the connections between the tooth portions 12ª, 13ª and the slots 36—37 formed in the upper end of the valve stems 25, 25ª a rubber housing 80 fits tightly over the inner ends of the tilting levers 12, 13 and over the upper end of the valve stems 25, 25ª. The rubber housing 80 provides a fluid tight enclosure to prevent pressure fluid in the valve chamber from coming into contact with the connection between the tilting levers and the valve stem and also provides a suitable chamber adapted to contain grease or other lubricant so as to minimize friction and consequent wear on the toothed elements 12ª.

I claim:

1. A valve structure comprising a casing having inlet and outlet ports and having also an opening in a side wall thereof, a valve element movably positioned in the casing for opening and closing said outlet port, centering arms for maintaining the valve element centered relative to said outlet port, means for operating the valve element including a valve operating lever extending in the direction of its length through said opening in the wall of the casing and into operative connection with a portion of the valve element, and a composite seal for closing the side opening in said casing comprising a compressible faces portion clamped to the casing, a rigid central portion positioned intermediate the opposite faces of the seal and providing a bearing support for said lever, and flexible sleeve portions extending outwardly from the opposite faces of said seal in sealing engagement with said lever.

2. A flexible coupling unit comprising two metallic arms arranged in endwise abutting engagement with each other to prevent yeilding movement lengthwise of the arms, and a rubber body surrounding the abutting end portions of the metallic arms and formed with deep recesses on opposite sides only whereby the rubber body is made flexible in one plane to provide a hinge movement.

3. A valve structure as defined in claim 1 characterized in that the sealing means comprises a rubber body clamped to the valve casing and surrounding the valve operating lever at its point of fulcrum and is bonded thereto to prevent leakage between the lever and the rubber body.

4. A valve structure as defined in claim 3 characterized in that the said rigid central portion includes a metallic plate bonded to said rubber body and provided with a bearing surface for movable engagement with said valve operating lever at its point of fulcrum and is bonded port for the lever.

5. A valve structure as defined in claim 4 characterized in that the rubber body is positioned to shield the metal plate from a fluid within the valve casing.

6. A valve structure as defined in claim 5 characterized in that the valve casing is formed with an outwardly extending rib surrounding said opening through the side wall, the rubber body is a disc formed with a V-shaped groove concentric with its axial center adapted to receive said outwardly extending rib, and means for clamping the rubber body against said rib.

7. A lever support and sealing element comprising a lever, a rubber body formed with a flexible portion surrounding and secured to a portion of the lever to provide a fluid tight seal between the lever and the rubber body and rigid non-movable means associated therewith and formed with an opening therethrough to receive said lever from either side thereof and to provide a fulcrum support for the lever.

8. A lever support and sealing element as defined in claim 7 comprising a metallic plate formed with an opening therein to provide a fulcrum bearing surface for the lever, and two bodies of rubber bonded to opposite sides of said plate and to the lever at opposite sides of the plate.

9. A valve structure as defined in claim 1 characterized in that a second opening is formed in the side wall of the valve casing at a location diametrically opposite the first mentioned opening, that a second valve operating lever is sealed through the second opening in the side wall of the casing and has operative connection with a portion of the valve element, and a cam ring positioned to embrace a portion of the valve casing and rotatable about the longitudinal axis thereof is operatively connected with the outer ends of both levers, whereby movement of the cam ring in one direction tilts the operating levers in a direction to open the valve element and movement of the cam ring in a reverse direction tilts said levers in a direction to close the valve element.

10. A valve structure as defined in claim 9 characterized in that rollers are journaled on the outer ends of said levers and the cam ring is formed on its inner face with a pair of identical cam channels providing trackways for said rollers.

11. A valve structure as defined in claim 10 characterized in that the terminal ends of the cam channels are formed with slight inclinations so as to produce slow movement of the valve operating levers and the intermediate portions of the cam channels have steep inclinations so as to effect quick movements of the valve element.

12. A valve structure as defined in claim 11 characterized in that the valve element includes a valve stem formed on opposite sides near its end with transverse channels, the inner end of each valve operating lever is formed with a gear tooth extending into one of said transverse slots, the walls of each transverse channel being formed with a contour corresponding to the contour of the tooth received therein.

13. A valve structure as defined in claim 12 characterized by the provision of a flexible fluid impervious housing enclosing the tooth ends of the valve operating levers and the portions of the valve stem engaged therewith to seal the enclosed parts from the fluid with the valve chamber and to also provide a lubricant container.

14. A valve structure as defined in claim 13 characterized in that the main valve element is provided with an auxiliary port therethrough and the valve stem has a lost motion connection with the element and is provided with a valve portion for closing said auxiliary port, whereby the initial movement of the valve operating levers in a direction to move the main valve element to its open position opens the auxiliary valve in advance of the opening of the main valve element.

15. A valve structure as defined in claim 14 characterized in that a coiled compression spring is carried by the valve stem and is positioned to apply progressively increasing pressure to the valve element, during the opening movement of the auxiliary valve, tending to open the main valve element.

16. In a valve structure including a casing having a fluid passageway therethrough and a valve element movably positioned within said casing in spaced relation to the wall thereof for opening and closing said passageway, a plurality of arm units flexible intermediate their ends and supported on an inner wall of the casing at spaced locations encircling the valve element, each arm unit including a spherical rubber body secured to the valve casing and to an inwardly projecting arm portion which engages said valve element; the rubber body being grooved on opposite sides to provide flexibility thereof in a single plane.

17. A valve structure as defined in claim 16 characterized in that the valve element is formed with socket openings therein for loosely receiving the inner ends of said inwardly projecting portions of said flexible units.

References Cited in the file of this patent

UNITED STATES PATENTS

| | | |
|---|---|---|
| 538,896 | Cavallaro | May 7, 1895 |
| 564,047 | Connelly | July 14, 1896 |
| 674,696 | Gardenier | May 21, 1901 |
| 1,255,389 | Cornelius | Feb. 5, 1918 |
| 1,488,013 | Lundblad | Mar. 25, 1924 |
| 1,735,982 | Short | Nov. 19, 1929 |
| 1,793,888 | Whitehouse | Feb. 24, 1931 |
| 1,821,096 | Hicks | Sept. 1, 1931 |
| 1,848,521 | Fleck | Mar. 8, 1932 |
| 2,065,834 | Swennes | Dec. 29, 1936 |
| 2,158,890 | Antelme | May 16, 1939 |
| 2,194,256 | Allen | Mar. 19, 1940 |
| 2,226,505 | Saurer | Dec. 24, 1940 |
| 2,239,299 | Lord | Apr. 22, 1941 |
| 2,241,026 | Wylie | May 6, 1941 |

FOREIGN PATENTS

| | | |
|---|---|---|
| 17,349 | France | of 1913 |
| 786,893 | France | June 24, 1935 |

UNITED STATES PATENT OFFICE
CERTIFICATE OF CORRECTION

Patent No. 2,844,168                                        July 22, 1958

Karl A. Klingler

It is hereby certified that error appears in the printed specification of the above numbered patent requiring correction and that the said Letters Patent should read as corrected below.

Column 2, line 17, for "elements" read -- element --; column 5, lines 37 and 38, for "comprising a compressible faces portion" read -- comprising compressible face portions --; lines 61 and 62, for "operating lever at its point of fulcrum and is bonded port for the lever" read -- operating lever to provide a non-resilient pivotal support for the lever --.

Signed and sealed this 28th day of October 1958.

(SEAL)
Attest:

KARL H. AXLINE
Attesting Officer

ROBERT C. WATSON
Commissioner of Patents